(No Model.)
W. A. ROCKLIFF.
VACUUM GAGE.
No. 503,330. Patented Aug. 15, 1893.
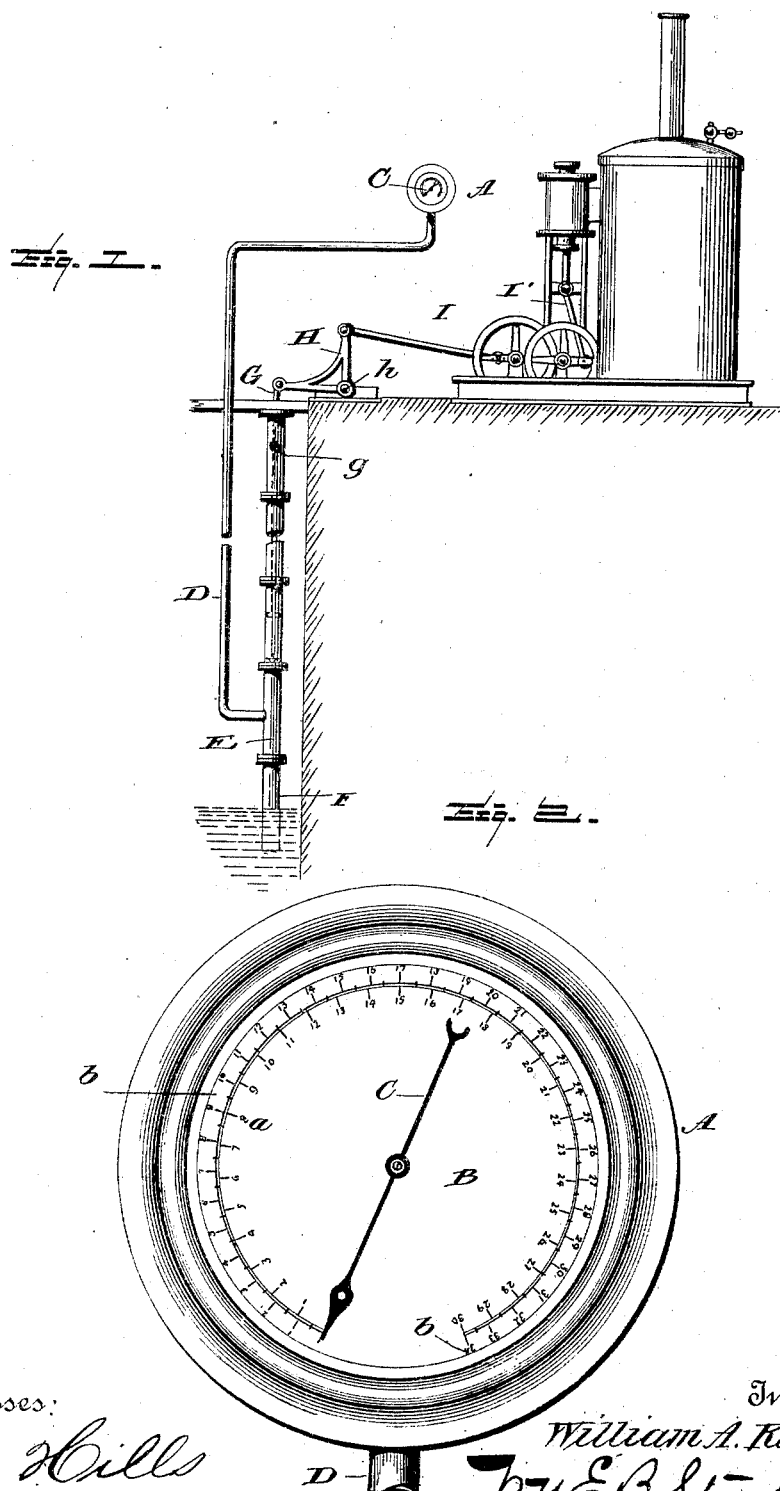
Witnesses:
L. C. Hills
E. H. Bond
Inventor:
William A. Rockliff
by E. B. Stocking
Attorney

UNITED STATES PATENT OFFICE.

WILLIAM A. ROCKLIFF, OF RUMSEY, MONTANA.

VACUUM-GAGE.

SPECIFICATION forming part of Letters Patent No. 503,330, dated August 15, 1893.

Application filed April 25, 1893. Serial No. 471,821. (No model.)

*To all whom it may concern:*

Be it known that I, WILLIAM A. ROCKLIFF, a citizen of the United States, residing at Rumsey, in the county of Granite, State of Montana, have invented certain new and useful Improvements in Vacuum-Gages, of which the following is a specification, reference being had therein to the accompanying drawings.

This invention relates to certain new and useful improvements in gages and devices for determining the exact height that the pump is lifting the fluid that it is pumping by suction. I provide an improved gage and dial so graduated that when there is a certain degree of vacuum in the gage tube the pointer will indicate the height of the column of water that is being sustained by that vacuum. Thus when the pump is running and this gage is attached to the suction pipe thereof it will at all times indicate the distance in feet and fractions thereof that the pump is raising the fluid being pumped by suction. A perfect vacuum at sea level being reckoned at thirty inches (29.9218 inches exact) will sustain a column of water at a height of thirty-four feet or (34.0082 exact). The first figures are however considered sufficiently accurate for ordinary purposes; by dividing the amount of vacuum (thirty inches) by the height of the column of water sustained (thirty-four feet) we have eight hundred and eighty-two inches the degree of vacuum that will sustain a column of water one foot in height; the dial is therefore graduated accordingly so that it will indicate one foot of water in the suction pipe when there is eight hundred and eighty-two inches of vacuum present in the suction pipe, and so on until a perfect vacuum is reached at thirty inches when it shows thirty-four feet; this dial is also graduated to show the degree of vacuum present and can be used as an ordinary vacuum gage if desired.

Among the advantages to be derived from the use of my improved gage may be mentioned that it provides a means of ascertaining how high the pump to whose suction pipe it is attached is lifting its water by suction or atmospheric pressure, and thereby enabling the attendant to regulate the speed of the pump so as to keep the water or other fluid being pumped at any desired distance from the pump cylinder. The gage is simple in its construction, easily attached to the suction pipe and can be located at any desired distance from the pump. Suitable connections are made with an engine or other devices for operating the pump.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which—

Figure 1 is a side elevation showing the application of my invention. Fig. 2 is an enlarged face view of the gage.

Like letters of reference indicate like parts in both of the views where they appear.

Referring now to the details of the drawings by letter, A designates a vacuum gage of any suitable construction interiorly. For instance, it may be and preferably is of the Bourdon type, my invention in this regard being merely in the manner of graduating the dial, which, being designated by the letter B, will be seen as provided with the two sets of graduations $a$ and $b$, the former indicating the inches of vacuum, and the latter the height of water in the suction pipe. These graduations are formed on the basis above specified, that is, the perfect vacuum at the sea level being reckoned at thirty inches, sustaining a column of water thirty-four feet in height. The pointer C is connected in the usual manner with the curved tube of the gage and is designed to be operated in the usual manner.

This gage may be located at any desired point and is connected with and carried by the pipe or tube D which is connected at any desired point with the suction pipe E of the pump. This suction pipe is suitably supported in position and extends within the tank or well F any predetermined distance.

The pump rod G carries a piston of known construction and a suitable check valve is provided within the water pipe. The pump rod is operated through the medium of the two-armed lever H pivoted at $h$ to any suitable support, the end of one arm being pivotally connected with the end of the pump rod which has a joint at *g*, while the end of the other arm of the lever is pivotally connected with the pitman I connected with the crank pin of the engine I' which may be of any desired form, or type adapted for the purpose.

In operation the vacuum in the suction pipe will be indicated by the pointer and the graduations *a*, and the height of water in the well or tank can be readily ascertained therefrom. The less the vacuum the lower the water in the well and suction pipe, and it will thus be readily seen that the attendant is at all times kept posted as to the condition of the water so that he can readily regulate the speed of the pump or stop the same when the water gets low to prevent the pump from racing.

What I claim as new is—

1. A gage of the class described graduated to indicate the inches or degrees of vacuum and the height of water, substantially as specified.

2. A gage of the class described provided with graduations relatively proportioned to indicate simultaneously the inches or degrees of vacuum and the height of water in a suction pipe of a pump, as set forth.

3. A gage of the Bourdon type having its dial provided with two sets of graduations, one to indicate inches or degrees of vacuum and the other the height of water in the suction pipe of a pump, the graduations being proportioned relatively to each other to designate the vacuum and height simultaneously, as set forth.

4. The combination with a suction pipe of a pump, of a tube connected therewith, and a gage of the Bourdon type on the end of said tube and provided with two sets of graduations one to indicate the vacuum and the other the height of water in the suction pipe, said graduations being relatively arranged to designate the vacuum and height of water simultaneously, substantially as specified.

5. The combination with the suction pipe of a pump and its piston, of a tube connected with the suction pipe below the piston, a gage connected with said tube and provided with two sets of graduations, one to indicate the vacuum and the other the height of water in the suction pipe, said graduations being relatively proportioned to designate the vacuum and the height of water simultaneously, and a two armed lever pivotally mounted and having one arm connected with the pump rod and a connection between the other arm of said lever and the crank-pin of an engine, substantially as specified.

6. The combination with the suction pipe of a pump and its piston, of a tube connected with the suction pipe below the piston, a gage connected with said tube and provided with two sets of graduations, one to indicate the vacuum and the other the height of water in the suction pipe, said graduations being relatively proportioned to designate the vacuum and the height of water simultaneously, a two armed lever pivotally mounted and having one arm connected with the pump rod and a connection between the other arm of said lever and crank pin of an engine, the pump rod having a joint between the piston and the connection with the lever, substantially as specified.

In testimony whereof I affix my signature in presence of two witnesses.

W. A. ROCKLIFF.

Witnesses:
S. LAVELLE,
S. WOODS.